United States Patent Office 3,129,239
Patented Apr. 14, 1964

3,129,239
PRODUCTION OF ESTERS OF THIOBORIC ACID AND HYPOTHIOBORIC ACIDS
Konrad Lang, Leverkusen, Germany, assignor to Farbenfabriken Bayer Aktiengesellschaft, Leverkusen, Germany, a corporation of Germany
No Drawing. Filed Mar. 8, 1960, Ser. No. 13,428
Claims priority, application Germany Mar. 10, 1959
9 Claims. (Cl. 260—462)

The present invention relates to a simple and convenient process of producing esters of thioboric acid and hypothioboric acids. The compounds obtainable by the process of the invention correspond to the general formula $$H_nB(SR)_{3-n}$$

wherein $n$ is 0, 1 or 2, and R stands for a radical selected from the group consisting of aliphatic hydrocarbon containing 1 to 30 C-atoms, aromatic hydrocarbon, alkylphenyl, halophenyl, nitrophenyl, alkylphenylether such as alkoxyphenyl, lower alkoxyalkylphenyl, alkylnaphthyl, halonaphthyl, nitronaphthyl, and alkylnaphthyl-ether such as alkoxynaphthyl and lower alkoxyalkyl-naphthyl radicals.

Organic boron sulfur compounds are known to be highly active additives to lubricants and fuels for internal combustion engines. The compounds according to the invention are also useful as substitutes for high-energy fuels, e.g. alkylated pentaborane and alkylated decaborane, since they are substantially cheaper than the aforesaid known high-energy fuels; besides, the compounds of the invention show an essentially lower toxicity and a high energy content.

It is already known to produce thioboric acid esters; e.g. thioboric acid trialkyl esters are obtained by reacting silver- or lead-mercaptide or sodium-mercaptide with boron tribromide. This process, however, has the disadvantage that, when silver or lead mercaptide are used as starting products, troublesome and time-consuming recovery processes are required because of the high cost of these starting products. Moreover, the sodium-mercaptides have to be prepared by the cumbersome reaction of sodium dissolved in liquid ammonia.

The compound $H_2BSCH_3$ can be produced by reacting diborane and methylmercaptan at $-78°$ C. In view of the toxicity of diborane, the use of diborane in the technical scale production requires extraordinary precautions which render the process wearisome and complicated and impairs the economy of the process.

It is an object of the invention to provide a novel, simple and convenient process of producing thioboric acid esters from cheap starting products which can be handled in a simple manner.

Another object of the invention is to provide a process of producing esters of hypothioboric acids by using starting products which are substantially non-toxic.

Other objects of the invention will become apparent as the following description proceeds.

In accordance with the invention it has been found that esters of thioboric acid or esters of hypothioboric acids are obtained in a smooth reaction and in substantial quantitative yields at high temperatures from amine boranes and mercaptans. The process of the invention is illustrated by the following equations:

$$C_5H_5N \cdot BH_3 + 2C_6H_5SH \rightarrow HB(SC_6H_5)_2 + 2H_2 + C_5H_5N$$
$$(C_2H_5)_3N \cdot BH_3 + 3C_{12}H_{25}SH$$
$$\rightarrow B(SC_{12}H_{25})_3 + 3H_2 + (C_2H_5)_3N$$

As amine boranes there may be used in the process of the invention compounds of the general formula $$YN \cdot BH_3$$

In this formula YN stands for an amine selected from the group consisting of primary, secondary and tertiary aliphatic amines, aromatic amines, mixed aliphatic-aromatic amines, cycloaliphatic amines and heterocyclic nitrogen bases.

Examples for substances of the aforesaid class of compounds are: dimethylamine borane, diethylamine borane, dipropylamine borane, diamylamine borane, ethylene diamine diborane, trimethylamine borane, triethylamine borane, tripropylamine borane, tributylamine borane, N,N,N',N'-tetramethylethylenediamine diborane, trihexylamine borane, aniline borane, p-toluidine borane, N-methylaniline borane, N,N-dimethylaniline borane, N-ethylaniline borane, N,N-diethylaniline borane, N,N-dipropylaniline borane, N,N-dimethylcyclohexylamine borane, pyridine borane, morpholine borane, quinoline borane, pyrrolidine borane, piperidine borane, N-methylpyrrolidine borane, N-methylpiperidine borane. It is advantageous to use amine boranes derived from tertiary amines or heterocyclic nitrogen bases containing no hydrogen at the nitrogen atom.

The mercaptans of the general formula $$ZSH$$

wherein Z stands for an organic radical, which are useful for the process of the invention, are members of the class consisting of aliphatic mercaptans of the formula $$C_nH_{(2n+1)}SH$$

wherein $n$ stands for a number between 1 to 30; aromatic mercaptans of the formula $$C_6H_{[6-(n+m)]}(SH)_n(X)_m \text{ and } C_{10}H_{[8-(n+m)]}(SH)_n(X)_m$$

wherein X stands for a substituent of the class consisting of methyl, ethyl, propyl, hexyl, tertiary butyl, chlorine, bromine, fluorine, $NO_2$, alkoxyalkyl including lower alkoxyalkyl such as $CH_3OCH_2$, and alkoxy including lower alkoxy such as $CH_3O$ and $C_2H_5O$ radicals and $m$ and $n$ stand for integers between 0 and 5, the sum of $n$ and $m$ must not be larger than 6. Examples of the aforesaid mercaptans are methylmercaptan, ethylmercaptan, propylmercaptan, butylmercaptan, decylmercaptan, dodecylmercaptan, hexadecylmercaptan, thiophenol, p-thiocresol, m-hexylthiophenol, p-chlorothiophenol, p-ethoxythiophenol, α and β-naphthalenethiol.

The process of the invention is carried out at temperatures between 20° C. and the decomposition temperature of the reactants, preferably between 80 and 170° C.

The process can be carried out in the presence of solvents which are inert to the reactants.

Solvents which are suitable for the purpose of the invention are for example toluene, xylene, mineral oils, polyethylene glycol dialkylether, e.g. diethylene glycoldimethylether, and tetraethylene glycoldimethyl ether. Besides, it is possible to carry out the reaction with an excess of amine borane.

In general the reaction is carried out by heating the mixture of 1 to 3 mols of mercaptan and 1 mol of amine borane until strong evolution of hydrogen occurs, keeping the mixture at this temperature until the evolution of gas is finished, distilling off the amine and obtaining the thioester as residue.

According to another embodiment of the invention 1 mol of amine borane is heated to reaction temperature and 1 to 3 mols of mercaptan are then added and the mixture is worked up as described above. This embodiment is especially suitable in the manufacture of esters of the hypothioboric acids.

It is known from the literature that hypothioboric acid esters form addition compounds with tertiary amines, e.g. trimethylamine. Therefore it is a surprising feature of the invention that the reaction of amine boranes and mercaptans yields the free thioboric acid esters or hypothioboric acid esters, but does not produce addition compounds of these hypothioboric acid esters with the amines.

The invention is further illustrated by the following examples without being restricted thereto.

*Example 1*

$(C_2H_5)_3N \cdot BH_3 + 2C_{12}H_{25}SH$
$\rightarrow HB(SC_{12}H_{25})_2 + (C_2H_5)_3N + 2H_2$ A mixture of 115 g. (1 mol) of N-triethylamine borane and 606 g. (3 mol) of dodecylmercaptan is heated to an inside temperature of about 120° C. in a round flask fitted with an agitator and reflux condenser, until the evolution of hydrogen is completed. Triethylamine formed in the reaction is then distilled off and the last traces of amine borane and mercaptan are removed by heating the reaction product to 110° C. at 1 mm. Hg pressure. A colourless to weakly yellowish (especially when overheating) liquid remains, the composition of which corresponds to the formula $B(SC_{12}H_{25})_3$.

*Example 2*

$(C_2H_5)_3N \cdot BH_3 + 2C_{12}H_{25}SH$
$\rightarrow HB(SC_{12}H_{25})_2 + (C_2H_5)_3N + 2H_2$ As described in Example 1, 115 g. (1 mol) of triethylamine borane are reacted at 120° C. with 404 g. (2 mol) of dodecylmercaptan. The purification is carried out again by distilling off the amine, amine borane and mercaptan up to 110° C. at 1 mm. Hg pressure. A viscous colourless to whitish oil remains which, upon prolonged standing, crystallizes as white aggregates having the composition $HB(SC_{12}H_{25})_2$. Hydrogen bound to boron may be liberated at room temperature, with ethanol and sulphuric acid.

I claim:

1. Process for preparing an organic boron sulfur compound of the general formula $$H_nB(SR)_{3-n}$$

wherein $n$ stands for an integer between 0 and 2, and R stands for a radical selected from the group consisting of alkyl containing 1 to 30 C-atoms, phenyl, naphthyl, alkylphenyl, halophenyl, nitrophenyl, alkoxyphenyl, lower alkoxyalkylphenyl, akylnaphthyl, halonaphthyl, nitronaphthyl, alkoxynaphthyl, and lower alkoxyalkylnaphthyl radicals by reacting an amine borane of the general formula $YN \cdot BH_3$, wherein YN stands for an amine selected from the group consisting of primary, secondary and tertiary alkyl amines, aryl amines, mixed alkyl-aryl amines, cycloalkyl amines pyridine, quinoline, morpholine, pyrrolidine, piperidine, N-methylpyrrolidine, and N-methylpiperidine, with a mercaptan of the class consisting of aliphatic mercaptans of the formula $$C_nH_{(2n+1)}SH$$

wherein $n$ stands for a number between 1 to 30; and aromatic mercaptans of the formula $$C_6H_{[6-(n+m)]}(SH)_n(X)_m \text{ and } C_{10}H_{[8-(n+m)]}(SH)_n(X)_m$$

wherein X stands for a substituent of the class consisting of alkyl, halo-, nitro-, alkoxy- and lower alkoxyalkyl-radicals and $m$ and $n$ stand for integers between 0 and 5, the sum of $n$ and $m$ being not larger than 6, and recovering an ester of the group consisting of esters of thioboric acid and esters of a hypothioboric acid.

2. Process as claimed in claim 1 in which the process is effected in an inert solvent.

3. Process according to claim 1 wherein the reaction is carried out at a temperature of between 20° C. and the dissociation temperature of the reactants.

4. Process according to claim 1 wherein 1 mol of the amine borane is heated with from 1 to 3 mols of the mercaptan until the evolution of hydrogen is completed, and thereafter the resulting thioester is recovered by distilling off the amine present.

5. Process according to claim 4 wherein the 1 mol of the amine borane is first heated alone and then from 1 to 3 mols of the mercaptan are added and the heating continued until the evolution of hydrogen is completed.

6. Process according to claim 1 wherein the alkyl radical of X is a lower alkyl radical.

7. Process according to claim 1 wherein the alkoxy radical of X is a lower alkoxy radical.

8. Process for preparing a thioboric acid ester which comprises reacting between about 80 and 170° C., triloweralkylamine borane and alkylmercaptan, and recovering the thioboric acid ester formed by distilling off the amine formed.

9. Process for preparing a hypothioboric acid ester which comprises heating triloweralkylamine borane to a temperature between about 80 and 170° C., adding alkylmercaptan thereto, maintaining said temperature until strong evolution of hydrogen substantially ceases, and recovering the hypothioboric acid ester formed by distilling off the amine formed.

No references cited.